Aug. 27, 1935. J. L. JAFFE 2,012,720

LIGHTING FIXTURE CONSTRUCTION

Filed Aug. 15, 1933

INVENTOR.
Joseph L. Jaffe
BY
Fay, Oberlin & Fay
ATTORNEYS.

Patented Aug. 27, 1935

2,012,720

UNITED STATES PATENT OFFICE 2,012,720

LIGHTING FIXTURE CONSTRUCTION

Joseph L. Jaffe, Cleveland, Ohio

Application August 15, 1933, Serial No. 685,208

2 Claims. (Cl. 240—128)

In lighting fixtures, it is customary to provide the glass globes or shades with a flange of somewhat under-cut shape to seat into the holder, and retaining means, as set-screws are tightened through the holder at several circumferentially-spaced points against the glass flange to hold the globe. The thrust of the screws with their concentrated point-pressure occasions stresses in the glass, and heat-expansion and wind-pressure in exposed locations increases this tendency, and the flanges are frequently broken. Moreover, lamp-cleaners are prone to chip the flanges in removing the globes in setting them down on a hard sidewalk or floor. To ameliorate this difficulty, it has been proposed to spin a thin metal sheet reinforcement over the end and outside of the glass flange and trim out the center, leaving a fastened-on thin metal reinforcement covering the glass. It is difficult however, to attain the right result as regards the metal on the glass, and this process moreover cannot be practiced without considerable incidental breakage, since the globe must be clamped in a rotary spinning lathe and also must run the chance of withstanding the tool pressure. When a globe does break also under such circumstances, the pieces of glass are violently hurled out by centrifugal force and operators may be seriously cut. The inherent costs of such process have precluded its general adoption. In accordance with the present invention however, I am enabled to provide lighting fixture glassware with a strong durable holding-flange, and without risks incurred in mechanically working metal on fragile glass. The further very marked advantage may be had also, that a compensative adjustment for variations in the glassware may be made available at the same time.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:—

Figure 1:
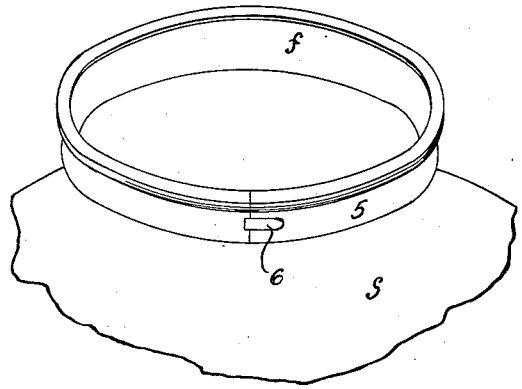
Figure 2:
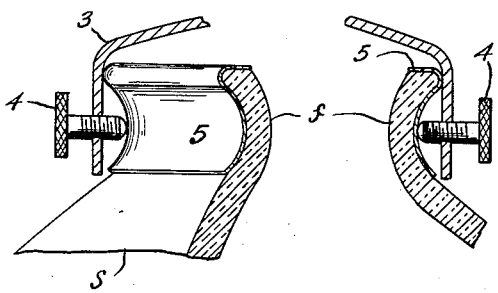
Figure 3:
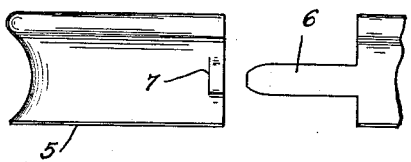
Figure 4:
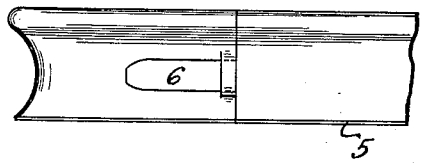
Figure 5:
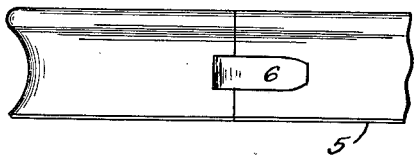
Figure 6:
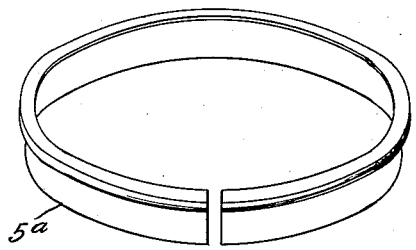

Fig. 1 is a perspective view showing an embodiment of the invention; Fig. 2 is a fragmentary sectional detail; Fig. 3 is a fragmentary elevational view of the locking portion of the detached thrust-ring; Figs. 4 and 5 are similar views showing successive stages of locking; Fig. 6 is a perspective view of a modification; and Fig. 7 is a sectional detail of another modification.

Referring more particularly to the drawing, there is shown a globe or shade S of glass, having a flange $f$ of circular form to seat into a holder 3. The body of the glass shade may vary in its particular shape, whether of open or closed character, the precise detail as to this being immaterial to the present consideration, and the shade may be mounted in various arrangements of orientation as particular circumstances dictate, whether standing upright in its holder or inverted. Coacting with the holder and with the flange of the shade are retaining means of form desired, e. g. slide, spring or screw, and shown for illustration as clamping screws 4, these being threaded through the holder at circumferentially-spaced points to engage in the undercut of the flange $f$, and thereby hold the shade S in the holder. Interposed however, between the glass flange $f$ and the points of the set-screws 4 is a thrust-ring 5, which conforms generally to the contour of the glass flange, or at least sufficiently so as to carry the thrust and distribute it, such thrust-ring conveniently being removable. As shown in Fig. 1, the thrust-ring 5 may be of sheet metal, shaped to generally conform to and fit over the flange of the glass shade. Such metals as aluminum, brass and the like, are conveniently applicable. With a split ring, the holding of the position of the ring may be effected by the resiliency of the metal itself or by fastening means. As an example of desirable fastening means, a tongue 6 may be provided on one end of the split ring, as indicated most clearly in Fig. 3, and the other end of the split ring may carry a slot 7 to coact with such tongue, whereby when the tongue is inserted through the slot as illustrated in Fig. 4, the ends of the split ring may be in line. By now bending the tongue back down against the ring, as indicated in Fig. 5, it is secured firmly to the glass flange of the globe in working position, as seen in Figs. 1 and 2. Thus carried by the glass flange, and constituting to all intents and purposes a part thereof insofar as the placement of the globe is concerned, the clamping screws 4 may be set up thereagainst without risk of cracking off the corresponding portion of the flange, and the shade is held securely. On the occasion of removal for cleaning, etc., the metallic reinforcement on the glass flange safeguards the latter very completely as it is handled and set down upon hard surfaces, particularly if, as is usually preferable, the raw edge of the flange is covered by the metal as well as the face of the flange, as it is the edge which especially receives blows on being set down.

In the form of the invention shown in Fig. 6, the thrust-ring 5a is of metal having sufficient resiliency to allow of being sprung into place over the glass flange and hold firmly thereon by such engagement without necessity of recourse to further fastening means. Spring metals such as brass or light steel or the like are readily adaptable for this purpose.

Figure 7:
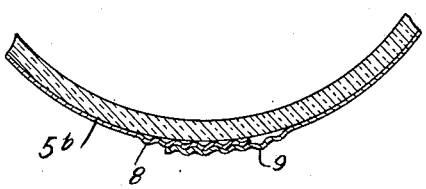

As shown in Fig. 7, a split ring 5b may be provided with end-holding means in the form of sufficient ribs or transverse corrugations 8, 9, to engage when the ends are overlapped.

In its various aspects, thus the invention is seen to provide a safeguard for a vulnerable flange portion of glass shades, and in a manner notably free from manufacturing breakage-risks. Furthermore, on account of the proneness of lighting fixture glassware from different sources to vary somewhat in its flange dimensions, a reinforcement thrust ring of a character here provided, readily makes possible a compensative take-up and accurate fit irrespective of quite wide discrepancies in dimension uniformity.

Other modes of applying the principle of the invention may be employed, change being made as regards the details described, provided the means stated by any of the following claims, or the equivalent of such, be employed.

I therefore particularly point out and distinctly claim as my invention:—

1. In a lighting fixture, a shade holder, shade-clamping means and an easily removable glove-fitting reinforce split ring-means of single and uniform thickness throughout its section with its inner surface convexed transversely to conform to a concaved flange of a glass shade and its outer surface concaved to receive the shade-clamping means, and over-extending end clamping means for said ring, said concaved outer surface being sufficiently concave to enclose said extending end.

2. In a lighting fixture, an easily removable glove-fitting sheet-metal reinforce split ring-means of single and uniform thickness throughout its section with its inner surface convexed transversely to conform to a flange of a glass shade and its outer surface concaved to receive shade-clamping means, the ends of the split ring overlapping and having a series of selectively adjustable interdigitating ribs.

JOSEPH L. JAFFE.